United States Patent [19]

Gulbrandsen

[11] 4,091,397
[45] May 23, 1978

[54] AUTOMATIC FILM CASSETTE CHANGING APPARATUS FOR USE IN AUTOMATIC PHOTOSTUDIO

[75] Inventor: Richard E. Gulbrandsen, Beverly, Mass.

[73] Assignee: Polaroid Corporation, Cambridge, Mass.

[21] Appl. No.: 777,512

[22] Filed: Mar. 14, 1977

Related U.S. Application Data

[63] Continuation of Ser. No. 679,053, Apr. 21, 1976, abandoned.

[51] Int. Cl.$^2$ ................ G03B 19/10; G03B 29/00
[52] U.S. Cl. ................................. 354/81; 354/174; 354/290
[58] Field of Search ............... 354/75, 76, 81, 170, 354/171, 173, 174, 215, 290

[56] References Cited

U.S. PATENT DOCUMENTS

3,744,389  7/1973  Clark ........................... 354/86
3,820,136  6/1974  Kennedy ........................ 354/81

Primary Examiner—John Gonzales
Attorney, Agent, or Firm—John S. Vale

[57] ABSTRACT

A photobooth and indexing system that includes a square frame having a motor driven film pack conveyor disposed about its periphery. The conveyor comprises 22 trays; 21 hold film packs and one holds a dummy pack. When a tray is indexed into position under the motorized film pack support, a ram lifts the pack up to an exposure position. A motorized support includes a rotatory solenoid operated pack, a pair of motor driven rollers and a film deflector for spread control. A logic system causes the dark slide to be automatically ejected into a film delivery chute. After 10 exposures, the logic causes the ram to be lowered thereby returning the empty pack to the underlying tray. The conveyor is indexed one tray position and the procedure is repeated. When the last tray arrives at the ram station, the dummy pack is elevated by the ram causing the logic to inhibit further operation of the photobooth until it has been reloaded with fresh film.

7 Claims, 6 Drawing Figures

AUTOMATIC FILM CASSETTE CHANGING APPARATUS FOR USE IN AUTOMATIC PHOTOSTUDIO

This is a continuation, of application Ser. No. 679,053, filed Apr. 21, 1976, now abandoned.

BACKGROUND OF THE INVENTION

1. Field of the Invention

The present invention relates to photography and, more particularly, to automatic, user-actuated photostudies for taking self-portraits.

2. Description of the Prior Art

Automatic photostudios or photobooths which are actuable by a user for taking self-portraits are well known in the prior art. Generally such a unit comprises a housing that is divided into a studio compartment where the user sits and an apparatus compartment housing a camera and film handling and processing equipment. Upon actuating the studio by inserting a coin, bill or token into a receiving mechanism, or by other means such as actuating a button or switch, the camera operates to expose a film unit therein and then the exposed film unit is automatically processed and made available to the user in a relatively short period of time.

Some automatic photostudios are configured to use conventional film and traditional wet chemical treatment for film development. The present invention, however, relates to photostudios that use film units of the self-developing type which are supplied in film cassettes. More specifically, the present invention is directed to apparatus for handling or changing cassettes that hold a limited number (i.e., 8 or 10) of film units therein in stacked relation.

In such photostudios, a full cassette is brought into operative relation with the camera to locate the forwardmost film unit in the stack in position for exposure. Subsequent to exposure, the film unit is advanced through a withdrawal slot, at one end of the cassette, and between a pair of pressure-applying rollers for distributing a fluid processing composition between predetermined layers of the film unit.

When "peel apart", self-developing film units are employed, the film unit is held for the required imbibition period and then the negative and positive elements are separated. The positive print is made available to the customer and the negative is deposited in a disposal bin. On the other hand, "integral" or non peel-apart self-developing film units may be advanced directly from the processing mechanism to the user since these film units generally include a self-contained opacification system that allows the development process to be carried out in ambient light.

Generally, a film counting mechanism is employed to count the film exposures and provide a signal when the last film unit has been exposed and withdrawn from the cassette. In response to the signal, a cassette changing or transfer apparatus is actuated and it removes the empty cassette from its operative position in the camera and replaces it with a full cassette taken from a supply of cassettes stored in the apparatus compartment of the photostudio.

Examples of automatic photostudios having cassette transfer or changing apparatus may be found in U.S. Pat. Nos. 3,797,823, 3,744,389, and 3,744,390 issued to Charles William Clark. The first patent was issued on Mar. 19, 1974; the latter two on July 10, 1973. Also see U.S. Pat. No. 3,820,136 issued on June 25, 1974 to C. Bruce Kennedy and being assigned to the same assignee as the present invention.

There are both similarities and differences in the above noted cassette changing apparatus. Both employ a camera having an open bottom, horizontally disposed, cassette locating chamber or frame. Next to the camera are one or more vertically disposed cassette storage magazines holding a vertical stack of cassettes therein. During a cassette changing cycle, the lowermost cassette in the stack is displaced laterally towards the open bottom cassette locating chamber or frame by a reciprocating mechanism.

In the Clark system, the stack of cassettes are held in the magazines by an inwardly protruding ledge which engages the underside of the lowermost cassette. The lowermost cassette is displaced from the ledge and drops onto a movable horizontally disposed plate behind a second cassette previously located on the plate. When the plate is displaced laterally toward the camera, the end thereof pushes a third cassette previously located on a guide frame into contact with an empty cassette located on a cassette carrier below the cassette locating frame of the camera. The third cassette displaces the empty cassette and takes its position on the carrier. The second cassette is moved into the position previously occupied by the third cassette, and likewise the first cassette occupies the previous position of the second. A new cassette from the magazine is then displaced from the ledge and drops down onto the plate and replaces the first cassette. The full cassette positioned under the camera frame is raised up into operative relation thereto by the carrier and is later lowered by the carrier after the cassette has been emptied for the next cassette changing cycle.

In the Kennedy system, the lowermost cassette in the magazine rests on a horizontal plate in line with a spring loaded tilting bed or cassette carrier under the open bottom cassette locating frame of the camera. When a cassette held in operative relationship to the camera is empty, the bed is tilted causing the empty cassette to fall into a disposal bin. A reciprocating mechanism then pushes the lowermost cassette from the stack onto the bed which moves it upwardly into its operative position in the locating frame. All of the cassettes in the vertical magazine then drop down one position under the influence of gravity.

Since automatic photostudios are intended to be serviced and maintained at infrequent intervals, it is imperative that such cassette changing mechanisms be as reliable as possible. It will be noted that both the Clark and Kennedy systems require sliding motion of the cassette to cause its transfer from the vertical magazine to the camera. There is vertical sliding motion of the cassette within the magazine followed by lateral sliding motion to a position directly under the cassette locating chamber or frame of the camera.

During the course of this sliding motion, there is always the possibility of a jam in the flow of the cassettes because of manufacturing variations in the cassettes or the manner in which they were loaded into the apparatus. The probability of a jam is also increased by the fact that the cassettes undergo intermediate transfers to reach the aligned position under the camera cassette locating frame. That is, they are first transferred from the magazine to a guide plate or surface and then are once again transferred to the aligned position.

SUMMARY OF THE INVENTION

The present invention relates to automatic, user-actuable photostudios for taking self-portraits and features a cassette changing apparatus which is configured to remove an empty cassette from its operative position in a camera and replace it with a full cassette without introducing sliding motion and/or intermediate transfer of the cassette during the changing process.

More specifically, the cassette changing apparatus of the present invention includes a closed loop or endless belt conveyor having a train of open bottom cassette holding trays thereon each configured to hold one cassette therein. The conveyor is disposed below the camera such that one tray thereon may be aligned directly under the open bottom cassette locating chamber or frame. Located within the closed loop of the conveyor in a cassette carrier or elevator which is mounted for vertical movement between a retracted position located below the aligned tray and an extended position above the aligned tray wherein it supports and locates a cassette in operative relation to the camera.

In operation, the elevator moves vertically through the open bottom of the aligned tray and raises the cassette therein upwardly into bearing relation with means in the cassette chamber or frame for positioning the cassette so that the forwardmost film unit therein is located in position for exposure. The elevator remains in the raised position and holds the cassette in place until all of the film units therein are exposed and extracted from the cassette. In response to an appropriate signal from a film counter or other device, the elevator is retracted to its position below the aligned tray thereby redepositing the empty cassette therein. Once the elevator is fully retracted, the conveyor is indexed one tray position along its closed loop path to move the tray holding the empty cassette out of the aligned position and the next following tray in the train, holding a full cassette, into the aligned position. The elevator then once again is moved upwardly to raise the fully loaded cassette into operative relationship with the camera.

Means are also provided for disenabling operation of the photostudio after the last full cassette has been brought into operative relation with the camera and the film units therein have been expended.

The only time the cassette is moved from its own individual holding tray is when that tray is at the aligned position. Then it is moved directly from the tray to the camera by the elevator. Rather than depending on gravity feed, sliding motion and intermediate transfer between a storage position and the aligned position, a cassette is carried to the aligned position in the individual holding tray into which it was initially loaded.

Therefore, it is an object of the invention to provide an apparatus which may be used in an automatic photostudio for moving film cassettes into and out of operative relation with a camera without causing the cassettes to slide relative to components of the apparatus during that portion of a cassette changing cycle when the cassette is moved from a storage position to a position in alignment with a cassette locating chamber or frame of the camera.

It is another object of the invention to provide such an apparatus which includes a closed loop conveyor having a train of trays thereon, each configured to hold one film cassette, said conveyor being movable along a closed loop path to sequentially present each of the trays at an aligned position below a cassette locating chamber or frame of the camera, and means for moving a cassette from the aligned tray into the locating chamber or frame and thereafter moving the cassette back to the aligned tray once the film units therein are expended.

It is yet another object of the invention to provide a photographic apparatus for use with cassettes holding a plurality of film units therein, said photographic apparatus comprising a camera including cassette locating means into which the cassette is adapted to be brought into engagement to locate a film unit therein in position for exposure, a conveyor for holding a plurality of such cassettes at an aligned position below the cassette locating means of the camera, and means for moving a cassette from the aligned position into engagement with the cassette.

Other objects of the invention will, in part, be obvious and will, in part, appear hereinafter.

BRIEF DESCRIPTION OF THE DRAWINGS

For a fuller understanding of the nature and objects of the invention, reference should be had to the following detailed description taken in conjunction with the accompanying drawings wherein.

DESCRIPTION OF THE PREFERRED EMBODIMENT

Figure 1:
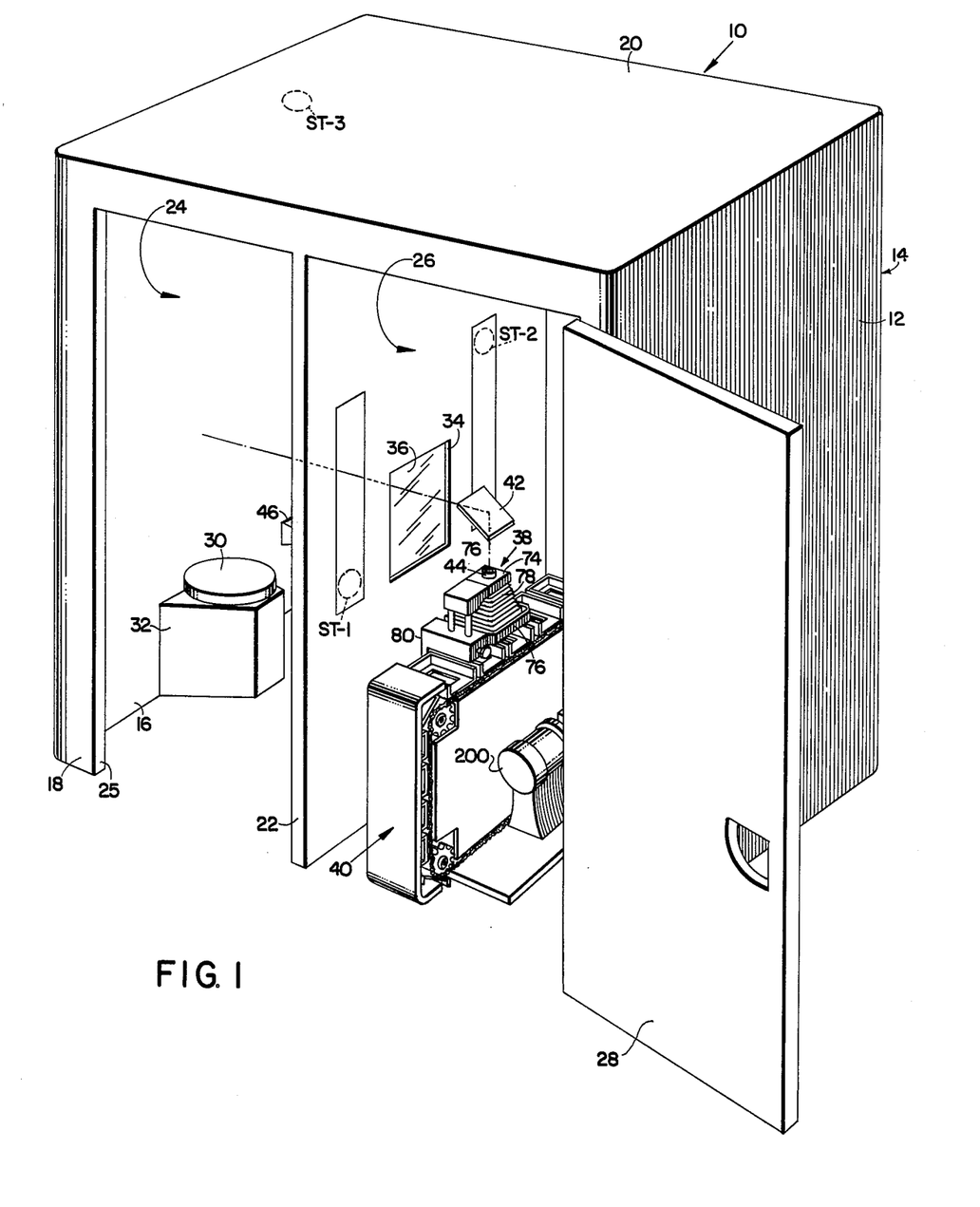
FIG. 1 is a perspective view of an automatic photostudio including a cassette changing apparatus embodying the present invention.

FIG. 1 of the drawings illustrates an automatic photostudio or photobooth embodying the present invention. Since the present invention primarily relates to moving film cassettes into and out of operative relation with a studio camera, other components of the studio will be described only in enough detail to provide the background necessary to understand the invention.

The studio includes a housing 10 formed by vertical side walls 12, 14, 16 and 18 and a horizontal top wall or roof 20. A vertical interior wall 22, extending between walls 14 and 18 and disposed in parallel relation to walls 12 and 16, divides housing 10 into a studio compartment 24 where the user sits to have his portrait taken and an apparatus compartment 26 which houses the automated apparatus for film exposure, processing and delivery of the film unit to the user, and cassette changing, all of which will be described in detail later in the disclosure.

Access to the studio compartment 24 is provided by a doorway 25, in wall 18, which optionally may be provided with a door or curtain. The apparatus compartment 26 is accessible through an adjacent doorway closed by a door 28.

Studio compartment 24 includes therein a vertically adjustable stool 30, mounted on a base 32 or any other suitable support, on which the user sits facing a generally rectangular aperture 34 in wall 22. Aperture 34 is covered by a half-silvered mirror 36 which allows the user to view an image of himself thereon by reflection as well as allowing light transmission therethrough into compartment 26 for the purpose of making a photographic exposure of the user.

Located in apparatus compartment 26 is a camera 38 for exposing and processing self-developing film units and a cassette handling or changing apparatus designated generally as 40 for moving cassettes holding a limited supply of film units into and out of operative relation with camera 38. Both camera 38 and apparatus 40 will be described in detail later on.

Camera 38 is disposed with its optical axis extending upwardly in a vertical direction and a mirror 42 is positioned above the camera objective lens 44 at an angle of 45° to the axis to define a folded optical path (shown in dotted lines) from the user seated on stool 30, through half-silvered mirror 36 to mirror 42 and downwardly to the objective lens 44 of camera 38. In a preferred embodiment, a light excluding baffle structure and support for mirror 42 is provided between the apparatus compartment side of mirror 36 and lens 44, but it has not been shown in FIG. 1 for the sake of visual clarity.

To illuminate the subject during the exposure phase, the studio may include strobe type light units which are positioned in a known manner for facilitating portrait photography and operate in predetermined timed relationship with the camera shutter. Such strobe units are diagrammatically illustrated in FIG. 1 as ST1, ST2, and ST3.

In use, the user adjusts the height of stool 30 until an image of his head and shoulders is properly framed in half-silvered mirror 36. He then deposits a coin, bill or token in a receiving device 46 (diagrammatically illustrated), mounted on the studio compartment side of wall 22, to actuate the photostudio. The camera shutter and strobe units operate to photoexpose the forwardmost film unit in a cassette located at the back of camera 38. The exposed film unit is then advanced from the cassette, through a pair of pressure-applying members to initiate film development and into a delivery chute (not shown) in wall 22 for delivery to the user.

Figure 2:
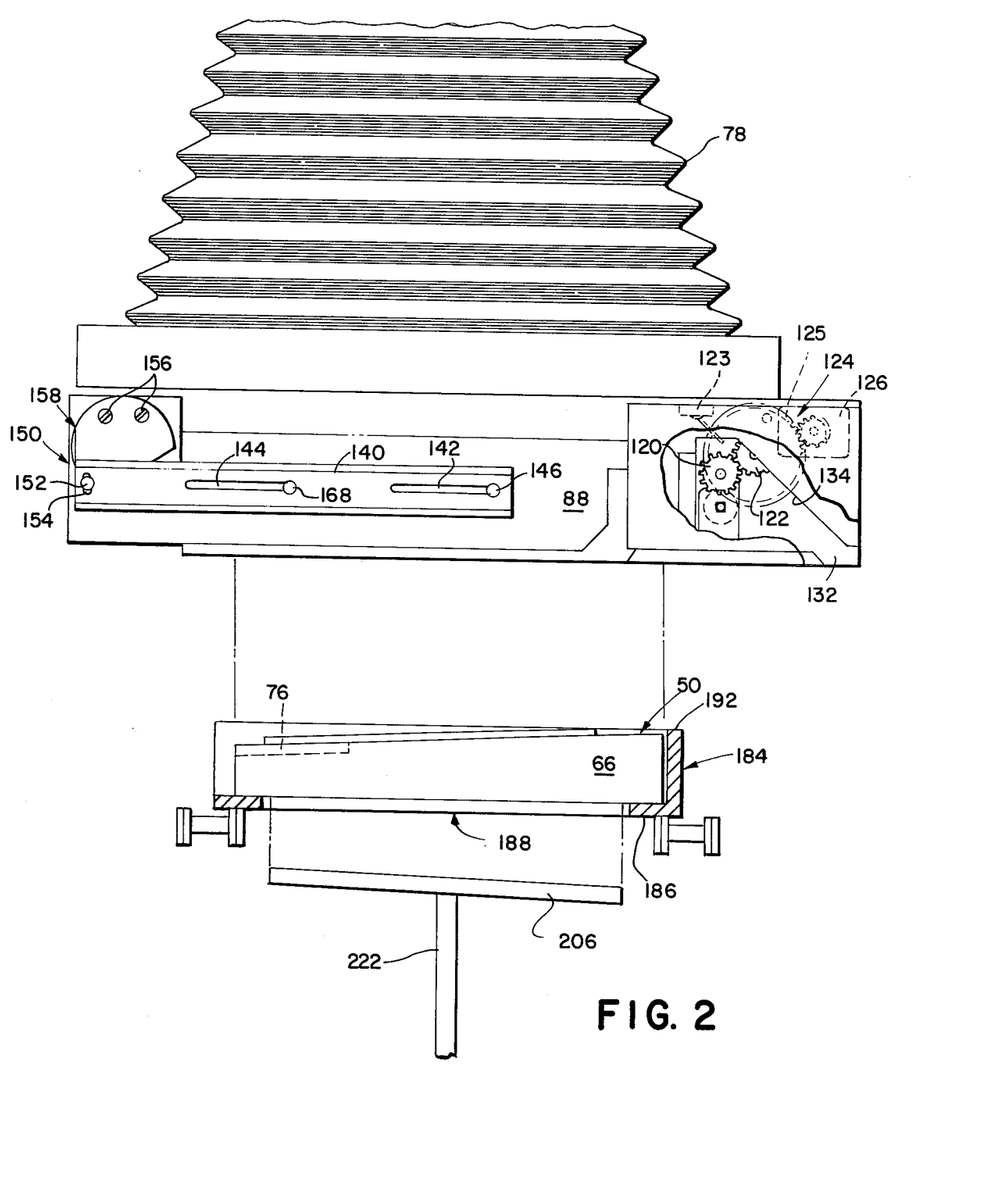
FIG. 2 is a side elevational view, partly in section, showing portions of a studio camera and said cassette changing apparatus.
Figure 3:
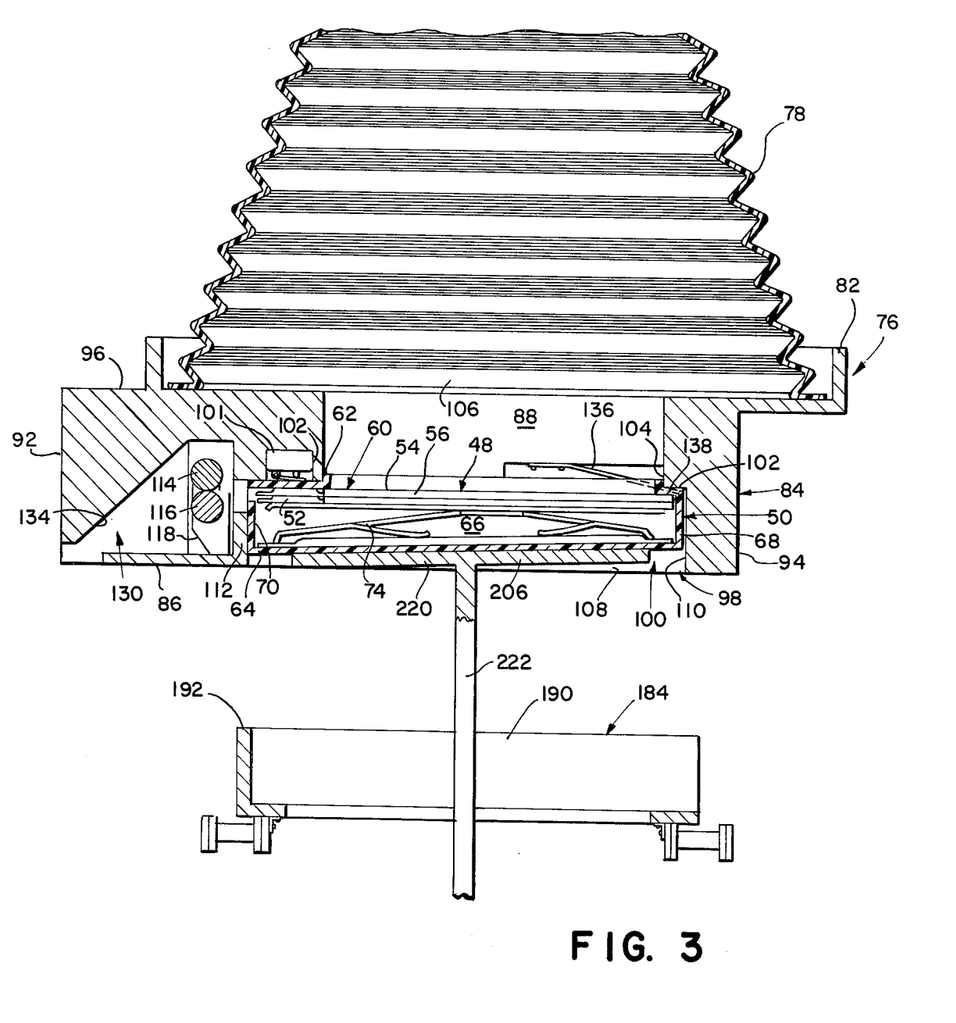
FIG. 3 is an elevational view, partly in section, of the opposite side of the portions of the camera and cassette changing apparatus of FIG. 3 showing a film cassette located at its operative position in the camera.

In a preferred embodiment, camera 38 is configured to expose and process "integral type" self-developing film units 48 which are supplied in film cassettes 50 (see FIGS. 2 and 3).

An integral, type, self-developing film unit 48 does not require the separation of individual positive and negative sheets subsequent to processing. Basically, it is a multi-layer structure bound at its edges and including an opaque bottom outer support sheet or layer; a transparent top outer support sheet or layer; and a plurality of superimposed layers of photographic materials, including one or more photosensitive layers and one or more image-receiving layers sandwiched between the two outer support sheets. Referring to FIG. 3, it can be seen that at one end of the film unit 48 is a rupturable container or pod 52 holding a supply of fluid processing composition.

The photosensitive material is adapted to be exposed by actinic light transmitted through the top transparent outer sheet. After exposure, a compressive pressure is applied progressively along the length of the film unit 48 to discharge the fluid from pod 52 and distribute it between a predetermined pair of adjacent layers to initiate the development and diffusion transfer process. In FIG. 3 again, the film unit 48 is diagrammatically illustrated as having a top sheet-like element 54 and a bottom sheet-like element 56 between which the fluid is distributed, but in reality elements 54 and 56 are multi-layer structures.

The processing fluid preferably includes a light opacification system which prevents light from penetrating through the distributed layer of fluid and causing further exposure of the photosensitive materials. This allows film unit 48 to be ejected from the camera into ambient illumination while the development and diffusion transfer process is in progress. Once this process is complete, the positive image is viewable through the top transparent outer sheet 54.

For a detailed description of a representative example of such an "integral type", self-developing film unit 48, reference may be had to U.S. Pat. No. 3,415,644 issued to Edwin H. Land on Dec. 10, 1968.

The cassette 50, as shown in FIGS. 2, 3, 4 and 5 is a box-like structure, preferably of molded plastic construction. It includes a generally planar forward wall 58 having a square or rectangular exposure aperture 60 therein through which actinic light is transmitted to expose the forwardmost film unit 48 in the stack. The exposure aperture 60 is bounded about most of its periphery by an integrally molded upstanding rib 62.

Spaced from forward wall 58 is an opposed generally planar rear wall 64. Intermediate forward wall 58 and rear wall 64 is a peripheral section of the cassette 50 defined by side walls 66, a trailing end wall 68 and a leading end wall 70 having a film withdrawal slot 72 therein adjacent the leading edge of forward wall 58.

In a preferred embodiment, there are ten (10) self-developing film units 48 arranged in stacked relation within cassette 50. The film units 48 are arranged therein with their top outer transparent sheets 54 facing aperture 60 and their pods 52 adjacent leading end wall 70. The stack is spring biased upwardly towards the interior surface of forward wall 58 by a spring platen 74 such that the forwardmost film unit bears against the interior surface and is aligned with withdrawal slot 72.

Subsequent to exposure, a forwardmost photoexposed film unit 48 is adapted to be engaged by a film advancing device in the camera 38 for movement through slot 72 and into engagement with a pair of pressure-applying members. Access for the film advancing device to engage the trailing end of the forwardmost film unit is provided by a slot 76 (shown in phantom in FIG. 2) which extends through a portion of rib 62 on forward wall 52, rearwardly along forward wall 52 to rear wall 68 and partway down rear wall 68.

Included in cassette 50, but not shown in the drawings, in a dark slide for initially protecting the stacked film units 48 from premature exposure until the cassette is located at its operative position in camera 38. Thereafter, the dark slide is ejected through withdrawal slot 72 in the same manner as a film unit 48.

It will be noted that the leading end of cassette 50 is a little thicker at its leading end to accommodate the relatively thick pods 52 at the leading ends of the film unit. In a preferred embodiment, the rear wall 64 of cassette 50 slopes away from the forward wall 58, in a direction from the trailing end to the leading end, at an angle of approximately 2° and the side walls 66 are tapered in a conforming manner.

The film units 48 are of the type that require an image reversal by the optical system to produce a correctly oriented positive image in the final print. In the illustrated optical system, this image reversal is provided by mirror 42. It will be understood, however, that other optical systems may be used which include an odd number of mirrors between the subject and the film plane. For example, see U.S. Pat. Nos. 3,821,760 and 3,852,783 which discloses an optical system including three mirrors in the exposure optical path and U.S. Pat. No. 3,820,136 that discloses a camera having a mirror between the objective lens and the film plane.

Camera 38 comprises a lens board 74 mounting the objective lens 44 and a shutter assembly (not shown); a camera back 76 including means for operatively locating a cassette 50 and means for processing an exposed film unit 48; and an extensible bellows 78 coupled between lens board 74 and camera back 76. In the illustrated embodiment, a camera support 80 is provided on the frame of the cassette changing apparatus 40 and supports camera 38 such that the camera back 76 is supported above and in a fixed predetermined relationship with apparatus 40 while the lens board 74 is adjustable, vertically, for focusing purposes.

As best shown in FIG. 3, camera back 76 includes an upper section 82 to which the back end of bellows 78 is attached and a depending lower section 84 for receiving and locating a cassette 50 in operative relation with camera 38 and for mounting film advancing and processing means.

Section 84 generally takes the shape of a parallelepiped and is bounded on its exterior by a horizontal bottom wall 86, a pair of vertical side walls 88 and 90, leading and trailing end walls 92 and 94, respectively, and a top wall 96 which interfaces in part with upper section 84.

Bottom wall 86 has a rectangular opening 98 therein dimensioned to admit the passage of a film cassette 50 therethrough into an interior cassette locating chamber or frame 100.

Locating chamber 100 is defined in part by a horizontal surface 102 having a rectangular or square opening 104 therein which provides communication between the lower chamber 100 and an upper rectangular passageway 106 that extends upwardly through top wall 96 in communication with the interior of the bellows 78.

The forward wall 58 of cassette 50 is adapted to bear against surface 102 to locate the forwardmost film unit therein at the camera's exposure plane. Thus, surface 102 serves as means for vertically locating the cassette with respect to the exposure plane. In a preferred embodiment, the opening 104 in surface 102 is dimensioned such that the upstanding rib 62 around the exposure aperture 60 of cassette 50 snugly fits therethrough, in telescoping fashion, and engages the vertical walls defining passageway 106 to locate the cassette 50 horizontally with respect to the exposure plane.

As cassette 50 is moved upwardly into chamber 100 towards surface 102, it is guided by vertical interior side walls 108 (only one of which is shown); a trailing end wall 110 and a leading end wall 112. It will be noted that leading end wall 112 is relatively short so that it does not block the film withdrawal slot 72 at the leading end of cassette 50.

As best shown in FIGS. 2 and 3, a pair of juxtaposed pressure-applying rollers 114 and 116 are rotatable mounted on a suitable bracket 118 on bottom wall 86 with the bite line of the rollers in alignment with the film withdrawal slot 72 of the operatively located cassette 50. The upper roller 114 has a gear 120, fixedly coupled to one end thereof, which is engaged in driving mesh with a roller drive gear 122 of roller drive assembly 124 coupled to wall 88 of camera back section 84. In a preferred embodiment, assembly 124 comprises a small electric motor 126 having its output shaft coupled to a speed reduction gear train designated generally as 128 which provides a suitable speed reduction and drives gear 122. Gear train 128 includes a timing gear 125 that is designed to undergo one revolution while a film unit is advanced to the outside of the camera 38. In this connection, timing gear 125 has a raised boss which trips a switch 127 also located on wall 88. The switch 127 is tripped at the end of one revolution of the timing gear 125 to provide a logic signal whose function will appear hereinafter.

Extending forwardly of the rollers 114 and 116 is a downwardly inclined passageway 130 leading to a film exit slot 132 at the leading end of lower section 84.

Subsequent to exposure, the forwardmost film unit 48 is adapted to be advanced through slot 72 and into the bite of rollers 114 and 116. Roller 114 is driven in a direction to cause the film unit 48 to pass between the rollers 114 and 116 which progressively apply a compressive pressure along the length of the advancing film unit to discharge the fluid from pod 52 and distribute it between the predetermined pair of layers within the film unit.

As the film unit 48 emerges from the exit side of the rollers, it engages a downwardly sloped surface 134, defining part of passageway 130, and is deflected downwardly towards exit slot 132 thereby temporarily inducing a large radius bend in the film unit. It has been found that this procedure significantly contributes to improving the uniformity of the fluid distribution within the film unit. The structure forward of rollers 114 and 116 also serves as a light shield to prevent light from traveling along the outer transparent sheet and fogging that portion of the film unit 48 behind the rollers 114 and 116 which has not as yet been protected by the opacifying system in the processing fluid.

As best shown in FIG. 3, the means for advancing the forwardmost film unit 48 through slot 72 includes an elongated resilient pick 136 having a hooked end 138 that is adapted to extend through the aperture 76 in the cassette 50 and engage the trailing end of the forwardmost film unit. The forward portion of pick 136 extends through a slot (not shown) in side wall 88 of lower section 84 and is fixedly attached to a slide member 140 that is best shown in FIG. 2. Slide member 140 includes slots 142 and 144 therein through which guide pins 146 and 148, respectively, that are fixedly attached to wall 88, extend to guide the movement of slide member 140.

Slide member 140 is adapted to be driven forwardly (to the right as viewed in FIG. 2) by a bell crank 150 which has an outwardly projecting drive pin 152 extending through an elongated slot 154 near the trailing end of slide member 140. In a preferred embodiment, bell crank 150 is attached, such as by screws 156, to the output plate of a rotary solenoid 158 mounted in a notch formed at the intersection of walls 88 and 94. Upon energization of the solenoid, the output plate rotates in a counterclockwise direction (as viewed in FIG. 2) about its axis through a limited arc of approximately 45° thereby rotating bell crank 150 in a counterclockwise direction to drive slide member 140 forwardly via pin 152. Upon deenergization of solenoid 158, the output plate rotates back to its normal position thereby moving bell crank 150 and slide member 140 back to the position shown in FIG. 2.

During an automatic picture taking cycle, the photostudio is actuated by the user and the camera shutter and strobe lights operate in timed relationship as will become apparent later. Image bearing light reflected from the subject passes through half-silvered mirror 36 and impinges on mirror 42 which reflects it downwardly through lens 44 to expose a forwardmost film unit 48 in the cassette 50 operatively positioned in chamber 100. The motor 126 is energized causing the top roller 114 to rotate and the solenoid 158 is energized to move pick 136 forwardly and cause the advancement of the film unit into the bite of the rollers 114 and 116. The rollers 114 and 116 apply pressure to the film unit and advance it through passageway 130 to the exit slot 132. In a preferred embodiment, exit slot 132 is in communication with a film delivery chute (not shown) in studio wall 22 that delivers the film unit 48 to the user in the studio compartment 24.

After the 10 film units in the cassette 50 have been expended, the cassette changing apparatus 40 is actuated to proceed through an automatic cassette changing cycle during which the empty cassette 50 in locating chamber 100 is removed and a full cassette 52 (see FIG. 4) is placed therein.

Generally speaking, apparatus 40 comprises a conveyor for moving a plurality of film cassettes 50 thereon about a closed loop path of travel to sequentially present each of the cassettes 50 at an aligned position below the open bottom of cassette locating chamber 100 of camera 38. It also includes means for moving or raising a cassette 50 from the aligned position on the conveyor into operative relation with the cassette locating means of the camera, holding the cassette 50 in the operative position until the film units 48 therein are expended, and thereafter returning it to the aligned position after which the conveyor is indexed to move the next full cassette into the aligned position.

The apparatus 40 includes a pedestal type base 160 which supports a generally rectangular apparatus support frame generally designated 162. In order to more clearly visualize the components and operation of apparatus 40, certain details of the support frame structure have not been shown in the drawings and in some instances pertinent portions will be shown in diagrammatic form. Also, in FIGS. 4 and 5, some of the components of apparatus 40 will be shown in diagrammatic form for the sake of visual and descriptive clarity.

Figure 4:
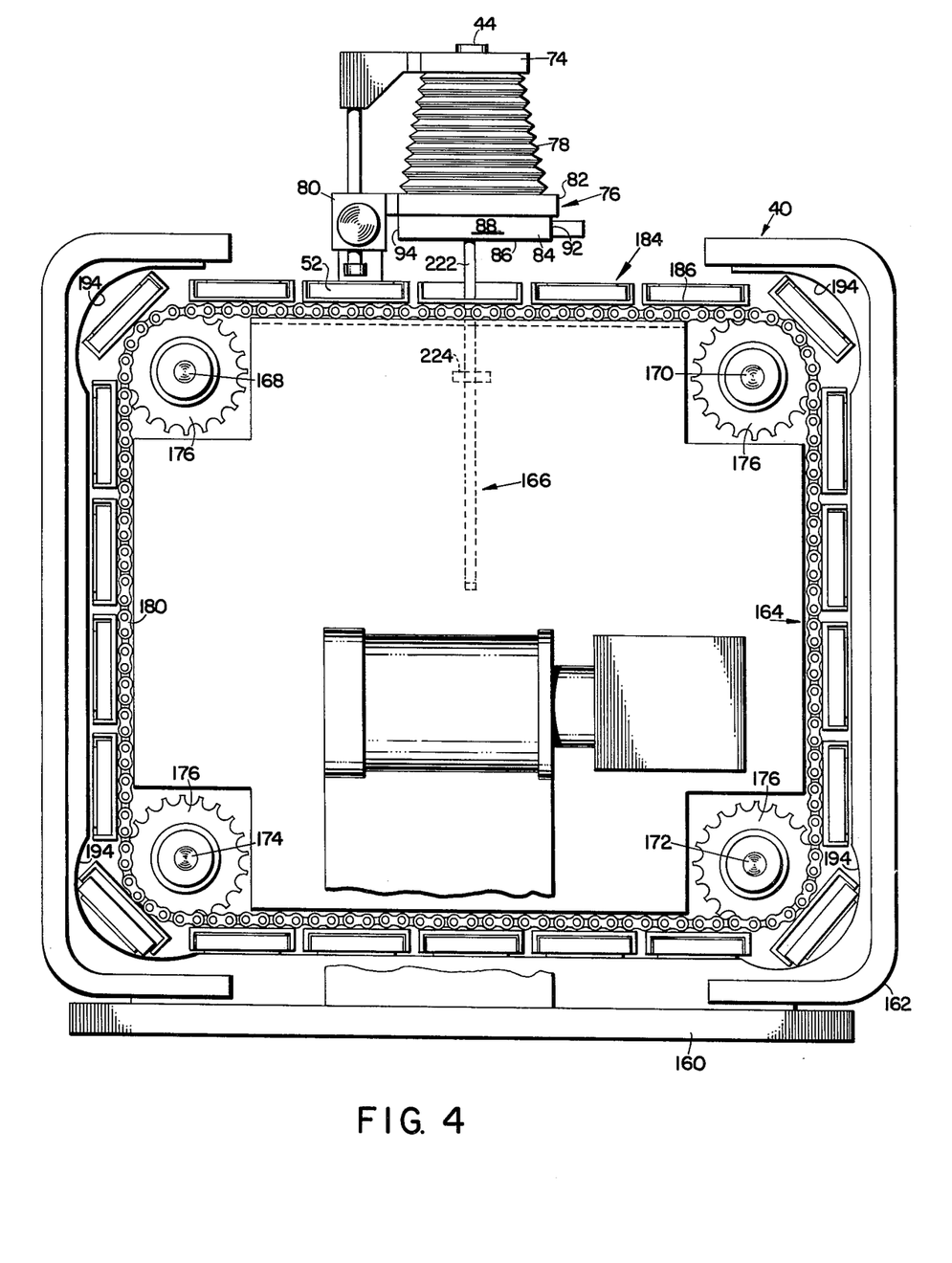
FIG. 4 is a front elevational view of the camera and the cassette changing apparatus embodying the present invention.
Figure 5:
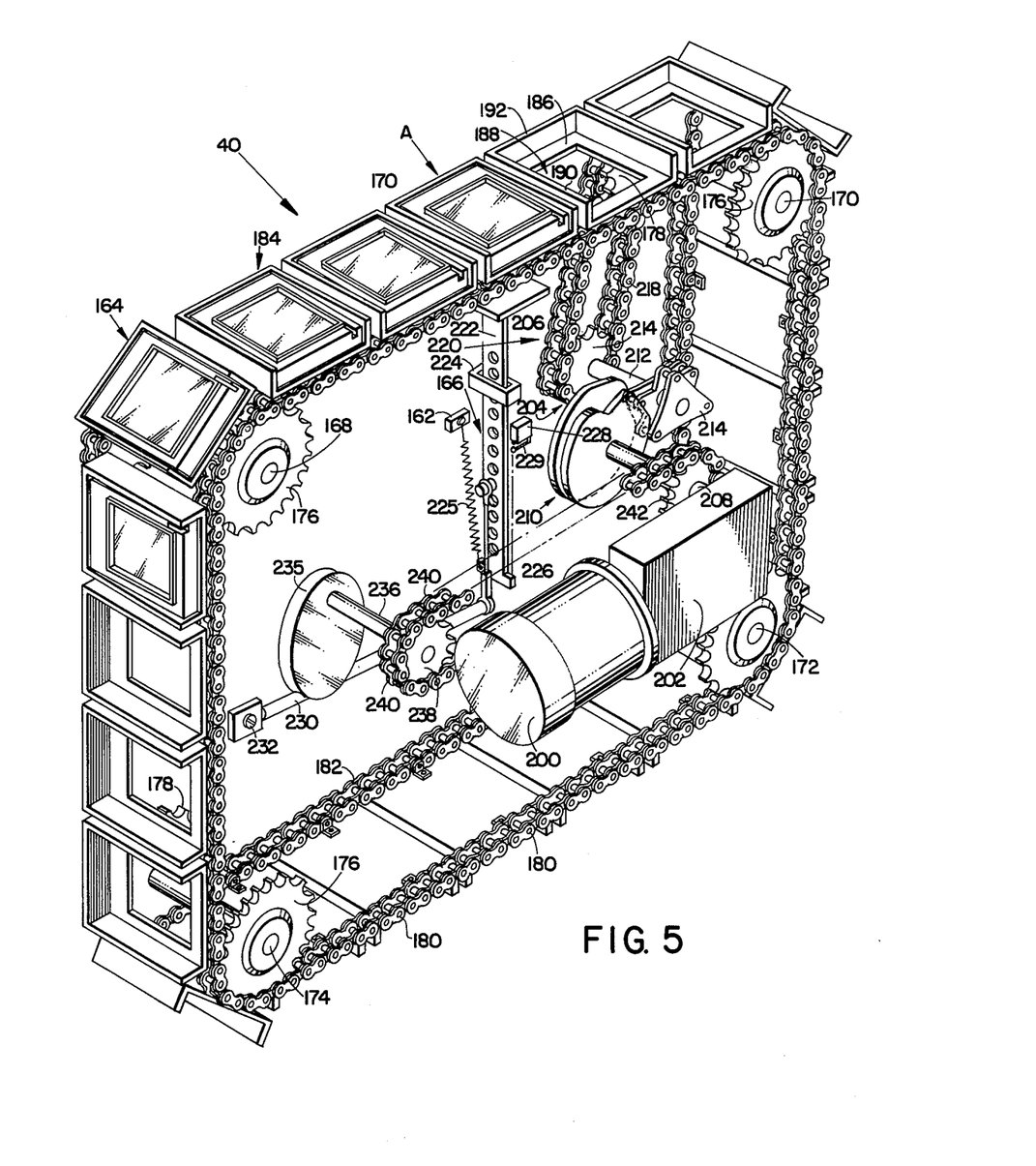
FIG. 5 is a perspective view of the essential components of the cassette changing apparatus without support structure to facilitate visualizing the construction and operation of the apparatus.

As best shown in FIGS. 4 and 5, apparatus 40 comprises a closed loop conveyor generally designated 164 and a cassette carrier or elevator mechanism generally designated 166.

Rotatably mounted on frame 162 near the four corners thereof are four transverse shafts 168, 170, 172 and 174 each having a pair of identical sprocket wheels fixedly secured to the opposite ends of these shafts. The sprocket wheels on the side of the conveyor closest to the viewer of FIGS. 4 and 5 are designated 176. The opposite sprocket wheels are designated 178.

The four sprocket wheels lie in a common plane and are drivingly coupled together by a closed loop of chain 180 which is supported in a generally rectangular closed loop by sprocket wheels 176. A similar chain 182 is similarly coupled between and supported by the four coplanar sprocket wheels 178. Thus the two chains 180 and 182 are disposed in spaced parallel relation for simultaneous movement when the shafts 168, 170, 172 and sprocket wheels 176 and 178 rotate.

Coupled to and extending between the chains 180 and 182 are a plurality of trays 184 each configured to receive a film cassette 50. The trays 184 are disposed along chains 180 and 182 in a train for movement with chains 180 and 182 about the generally rectangular closed loop path. In the illustrated embodiment, the conveyor includes 22 trays 184 equally spaced about the closed loop path such that there are 5 trays each along the top and bottom horizontal sides of the conveyor, 4 trays each along the vertical side, and 4 more trays rounding the corners at the sprocket wheels. Twenty-one of the trays 184 are intended to be loaded with live film cassettes, with the remaining one tray loaded with a dummy cassette whose function will be explained later on.

Each tray 184 includes a bottom wall 186 having a generally rectangular centrally disposed opening 188 therein, a pair of upstanding side walls 190 and an upstanding end wall 192 joining the ends of side walls 192 over chain 182. Each tray 184 is open at the top and at the end over chain 182.

The cassettes 50 are adapted to be loaded into the trays 184 through the open end with the rear wall 64 of the cassette resting on bottom tray wall 188 and the leading end wall 70 of the cassette having slot 72 therein facing the interior of tray end wall 192.

The trays 184 are configured such that the cassettes 50 fit snugly therein. After loading, a rectangular frame or guard (not shown) is secured to the support frame 162 in closing relation to the open ends of the trays to prevent their displacement with respect to the end walls 192 and side walls 190. To prevent the cassettes 50 from falling out of the trays that are travelling around the periphery of the conveyor, a cassette retaining structure or guide 194 provided slightly spaced from the path of travel of the trays. The retaining guide plate is not required over the five horizontally disposed trays on the top of the conveyor.

As noted earlier, the conveyor 164 is adapted to be indexed about the closed loop path to successively present each of the trays 184 at an aligned tray position designated as A in FIG. 5 wherein the cassette 50 supported therein is aligned directly below the open bottom cassette locating chamber 100 of the camera back 76. It is from this position that the cassette carrier or elevator 166 extends through the opening 188 of the aligned tray to engage the rear wall 64 of the cassette 50 and raise the cassette 50 to its operative position within chamber 100 as will be explained later on.

The means for indexing the conveyor preferably include an electric motor 200, a speed reduction gear box 202, a cam drive unit 204, and a chain drive 206.

The motor 200 has its output shaft coupled to the gear box 202 which provides a low speed output at an output shaft 208. Shaft 208 serves as the input drive for the cam drive unit 204 and drives a dual cam 210 mounted on the end of shaft 208. Adjacent cam 210 is an output shaft 212 having a cam follower structure 214 fixedly mounted on the inboard end of shaft 212 in position to be engaged and selectively rotatably driven by cam 210. Fixedly mounted on the outboard end of shaft 212 is a sprocket wheel 216 which is coupled to a sprocket wheel (not shown), mounted on the shaft 170 outboard of the sprocket wheel 178, by a drive chain 218.

The illustrated cam drive unit 204 is intended to diagrammatically show a representative example of any number of commercially available units that are commonly used to accurately index conveyor systems. During the course of a single revolution of cam 210, the follower 214 is alternatively subjected to a dwell period and an index or rotational period. That is, when a constant radius portion of cam 210 is engaged with follower 214, it does not rotate and drive output shaft 212. As the lobe or increased radius portion of cam 210 is brought into engagement with the follower 214, cam 210 rotates follower 214 until the lobe falls off back to the constant radius portion.

As will be explained later, the shaft 208 is intended to be driven through a single 360 degree revolution during the course of a cassette changing cycle, and during a portion of that single revolution, the output shaft 212 of the cam drive unit 204 rotates to drive the sprocket wheel 214 which in turn rotates the shaft 170 causing the sprocket wheels 176 and 178 thereon to drive the chains 180 and 182 and index or advance all of the trays 184 thereon one tray position with respect to the aligned position A.

The cassette carrier or elevator mechanism 166 comprises a plate-like cassette engaging platform 220 dimensioned to pass through the openings 188 in the trays 184, and a vertically depending member 222 fixedly secured to the underside of platform 220. Member 222 passes through a support and guiding collar 224 on frame 162 and is adapted to be moved vertically with respect to collar 224 between the retracted position of FIG. 5 wherein platform 220 is below the aligned tray 184 and the extended position of FIG. 4 wherein carrier 166 extends through the opening 188 and holds a cassette 50 in its operative position in the cassette chamber 100 of camera 38.

In a preferred embodiment, the carrier 166 is spring biased upwardly toward its extended position by means of a spring 225 having one end thereof attached to vertical carrier member 222 and its opposite end secured to the support frame 162. In order to accurately adjust the height of the carrier 166 in its extended position, a projection 226 is provided at the bottom of member 222 which is adapted to engage a vertically adjustable stop 228 mounted on the support frame 162. In this connection a switch 229 is provided in any well known manner between stop 228 and projection 226 to sense that the carrier 166 is in its extended position. Closure of switch 229 provides a logic signal whose use will be elaborated on later.

The carrier 166 is configured to be driven downwardly to its retracted position, against the bias of spring 224, by a rod 230 having one end pivotally coupled to frame 162 at pin 232 and its opposite end coupled to the bottom of vertical carrier member 222 by means of a coupling 234.

Rod 230 is engaged by an eccentric cam 235 which is rotatable through a single 360° revolution during the course of a cassette changing cycle to control the movement and position of carrier 166 in timed relationship with the indexing of the conveyor 164.

As best shown in FIG. 5, cam 235 is fixedly attached to one end of a shaft 236 which is mounted for rotation on support frame 162. Fixedly mounted on the opposite end of shaft 236 is a sprocket wheel 238 which is coupled by a drive chain 240 to a sprocket wheel 242 fixedly secured to the output shaft 208 of gear box 202. Since both the cam drive unit 204 and the carrier position cam 235 derive their rotational drive from the shaft 208, the movement of the cassette carrier 166 and the indexing of the conveyor may be coordinated by providing the proper shapes for cams 234 and 210.

Assume for the moment that carrier 166 is in its spring biased extended position as shown in FIG. 3 holding an empty cassette 50 in its operative position in chamber 100 of camera 38.

Cam 235 would be oriented so that its minimum radius section engages rod 230 allowing rod 230 to pivot to its uppermost position when carrier 166 is fully extended. The indexing cam 210, at this point is in a dwell relationship with the cam follower 214.

To begin the cassette changing cycle, motor 200 is energized and the output shaft 208 begins to slowly rotate through its single revolution. Cams 234 and 210 are simultaneously driven and begin to rotate. The increasing radius lobe of cam 234 pushes rod 230 downwardly retracting the carrier 166 so that the empty cassette is returned to the tray 184 at the aligned position A and the carrier platform 206 is located beneath the tray and clear of its path of travel. During the carrier retraction, rotating cam 210 and follower 214 are in the dwell mode. When the carrier 166 is fully retracted, the rising lobe of cam 210 engages and drives cam follower 214 causing the rotation of shaft 212 and the indexing of conveyor 164 one tray position to move the tray 184 holding the empty cassette 50 out of the aligned position A and the next tray 184 in the train, with a full cassette therein, into the aligned position A.

During the conveyor indexing phase, a constant radius portion of cam 235 is in engagement with and maintains rod 230 in its down position. The indexing is followed by a dwell phase of cam 210 and follower 214 during which a decreasing radius portion of cam 235 is in engagement with rod 230 thus allowing the carrier 166 to travel upwardly, under the influence of spring 224, and raise the cassette from aligned tray into operative relation with camera 38. At the end of the single revolution of shafts 208 and 236, the motor 200 is deenergized to terminate the cassette changing cycle.

Figure 6:
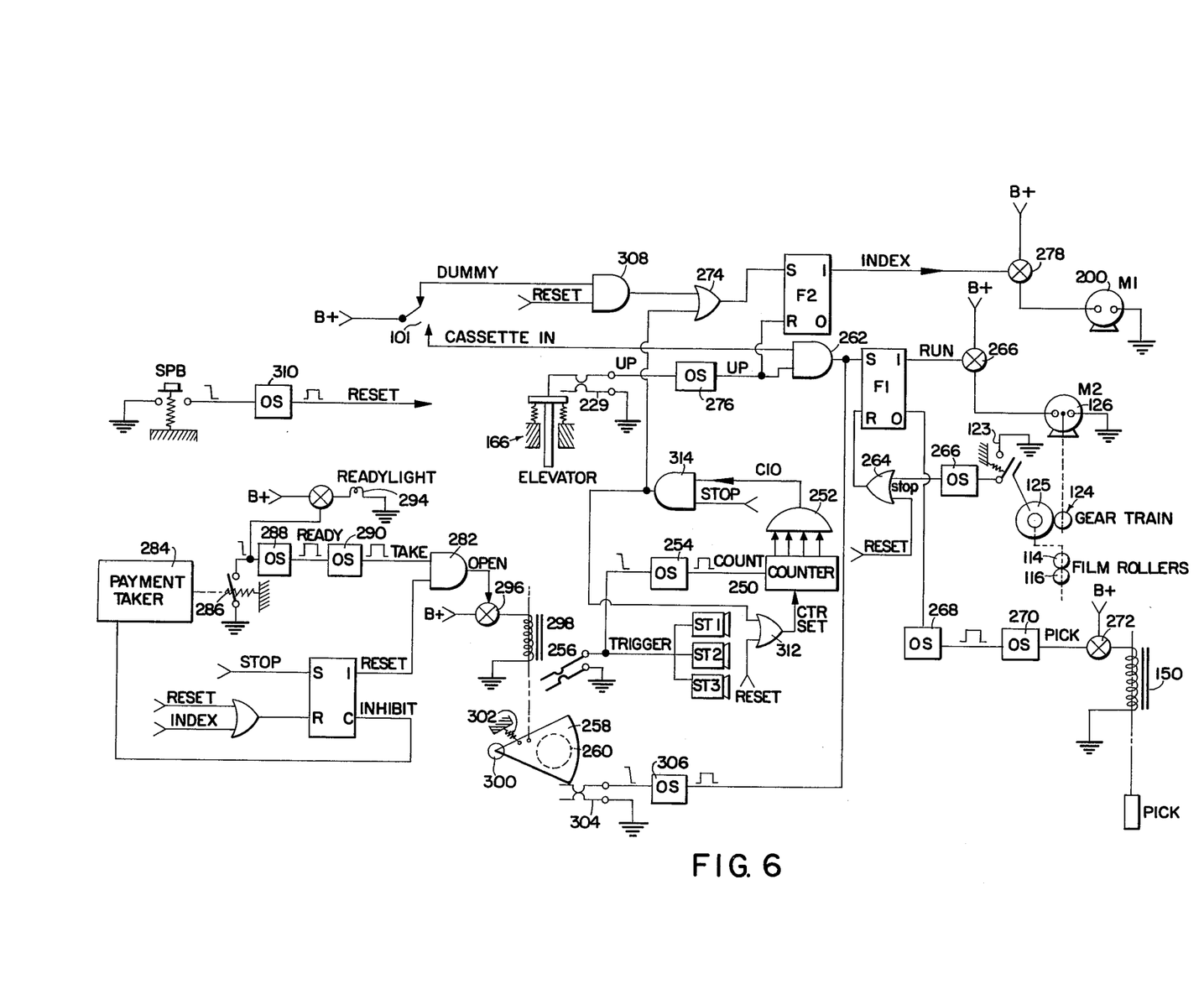
FIG. 6 is a schematic diagram of a system providing automatic operation of the photostudio.

FIG. 6 shows the control system for the apparatus of FIGS. 1 through 5. The three strobe units ST1, ST2 and ST3, diagrammatically shown in FIG. 1 are provided for supplying light when an exposure is to be made. These three strobe units may be provided with reflectors of any conventional form for directing light onto the subject. These units may be conventionally powered from an alternating current line, such as a 120 volt, 60 Hz.

The direct current voltage required to operate the rest of the apparatus may be derived from the same source through conventional power supply circuits. This DC source is connected between the terminals labeled B+ and a reference ground terminal.

The state of the system of FIG. 6 is determined by the conditions of three conventional flip-flops F1, F2, and F3, and by a conventional four-stage binary counter 250. Four selected terminals from each of the stages of the counter 250 are connected to a conventional AND gate 252, to produce a logic 1 signal (positive with respect to ground) labeled C10, each time 10 count pulses are applied to the counter 250.

A count pulse is provided to the counter 250 each time a conventional one-shot multivibrator 254 is triggered by the ground going transition produced when a switch 256 is momentarily closed. The ground level pulse produced when the switch 256 is closed, labeled TRIGGER, triggers the strobe units ST1, ST2, and ST3 simultaneously to produce an exposing flash. The switch 256 is arranged to be opened by a shutter blade 258 when the shutter is opened to expose an aperture 260 located behind the lens 44, as will be described.

The flip-flop F1 is arranged to be set, and thereby produce a logic 1 signal at its logic 1 output terminal, labeled RUN, when a conventional AND gate 262 produces a logic 1 output signal. The flip-flop F1 is reset when a conventional OR gate 264 produces a logic 1 output signal, that is applied to the reset input terminal R of the flip-flop F1.

When set, the flip-flop F1 applies the RUN signal to the control terminal of a conventional electronic switch 266, such as a transistor or the like. The RUN signal closes the switch 266 to supply load current from the supply terminal at B+ through the windings of the motor 126 and thence to ground, causing the motor to operate as long as the switch 266 is closed by the presence of the RUN signal. When the flip-flop F1 is reset, the RUN signal is absent, the switch 266 is open, and the motor 126 is stopped. When the motor 126 is energized in the presence of the RUN signal, it drives the gear train 124 which in turn rotates the timing wheel 125 until it turns through one revolution. Upon completing one revolution, the timing wheel 125 closes switch 123 thereby triggering a conventional one-shot multivibrator 266 that in turn produces the STOP signal. The STOP signal in turn triggers the OR gate 264 which produces a logic signal to reset the R terminal of flip-flop F1. The 0 logic output terminal of flip-flop F1 is triggered through the OR gate 264 when the signal labeled RESET is applied to the input terminal of the OR gate 264. With a logic 1 signal applied to the input R terminal of the flip-flop F1, its 0 logic terminal produces a logic pulse to trigger a conventional one-shot multivibrator 268 that has a built-in time delay. After the delay time on the one-shot multivibrator 268 has elapsed, it produces a logic pulse that triggers another conventional one-shot multivibrator 270 to produce the PICK signal.

The PICK signal is applied to the control terminal of a conventional electronic switch 272, such as a transistor or the like. The PICK signal closes the switch 272 to supply load current from the supply terminal at B+ through the windings of the rotary solenoid 150 and thence to ground causing the solenoid to operate as long as the switch 272 is closed by the presence of the PICK signal. When the flip-flop F1 is reset, the RUN signal and the PICK signal are absent; the switches 266 and 272 are open and the motor 126 and the solenoid 150 are de-energized. The function of the delay created by the one-shot multivibrator 268 is to ensure that the processing rollers 114 and 116 are rotating before the pick mechanism is actuated to advance a film unit into the bite of the rollers.

The flip-flop F1 may also be reset by the presence of a RESET signal applied at OR gate 264 which, in its presence, produces a logic 1 signal at the R terminal of the flip-flop F1.

The flip-flop F2 is arranged to be set, producing a logic 1 signal labeled INDEX at its logic output terminal, when a logic 1 input signal is applied to its S terminal by a conventional OR gate 274. The flip-flop F2 is reset by a logic 1 signal applied to its intput terminal R when a conventional one-shot multivibrator 276 produces a logic 1 output signal. The INDEX signal is applied to the control terminal of a conventional electronic switch 278, such as a transistor or the like. The INDEX signal closes the switch 278 to supply load current from the supply terminal at B+ through the windings of the motor 200 and thence to ground, causing the motor to operate as long as the switch 278 is closed by the presence of the INDEX signal. When the flip-flop F2 is reset, the INDEX signal is absent, the switch 278 is open, and the motor 200 is stopped.

The flip-flop F3 is arranged to be set by a logic 1 signal labeled STOP applied to its SET input terminal. The flip-flop F3 is reset when a conventional OR gate 280 receives either the signal RESET or the signal INDEX produced in a manner to be described.

When set, the flip-flop F3 produces a logic 1 signal labeled ACCEPT, at its logic output terminal, and when reset, the flip-flop F3 produces a logic signal labeled INHIBIT at its logic 0 output terminal. The ACCEPT signal is supplied to one input terminal of a conventional AND gate 282.

The INHIBIT signal may be employed to disable a conventional payment taker 284 in any well known manner as, for example, by lighting a lamp behind a sign indicating that the apparatus is not ready for use, by inserting a stop in a coin slot or a bill accepting tray, or otherwise making it apparent to the user that insertion of payment will not result in the taking of a picture because the apparatus is not ready for it. When the INHIBIT signal is absent, the payment taker 284 responds to the desired input by the user by momentarily closing a switch 286 to produce a ground level transition that triggers the conventional one-shot multivibrator 288. The ground level transition pulse caused by the closure of the switch 286 simultaneously is applied to a control terminal of the conventional electronic switch 292. Closure of the switch 292 supplies load current from the supply terminal at B+ through a ready light 294 and thence to ground. When the ready light 294 is lit, it is an indication to the user that his picture will be taken momentarily.

The one-shot 288 is of the conventional type which may be set to produce a time delay before it produces its output pulse. After an appropriate time which allows the user to compose himself, the one-shot 288 produces a pulse labeled READY which triggers conventional one-shot multivibrator 290. The one-shot 290 produces an output pulse labeled TAKE and is applied to one of the terminals of the conventional AND gate 282.

When both the signals TAKE and ACCEPT are present, the gate 282 produces a positive signal labeled OPEN that closes the conventional electronic switch 296 to supply energizing current to a shutter solenoid 298. The shutter solenoid 298 may be any conventional linear actuating device coupled in well known matters to the shutter blade 258.

As schematically indicated, solenoid 298 has an armature connected to the shutter blade 258. The blade 258 is pivoted, as suggested at 300, and resiliently biased by a spring 302 toward a position in which it closes the aperture 260.

In the closed position of the shutter blade 258, a switch 304 is closed. When the shutter blade 258 is open by energization of the solenoid 298, the switch 304 is open.

When the blade 258 is fully opened, the aperture 260 is uncovered to make an exposure and the switch 256 is closed to produce the TRIGGER signal, firing the strobe units and triggering the multivibrator 254 to produce a COUNT pulse. When the shutter blade 258 again closes after the solenoid 298 is released, which occurs at the end of the TAKE pulse, the switch 304 is momentarily closed to produce a ground going transition that triggers a conventional multivibrator 306 to produce an output pulse. The output pulse from the multivibrator 306 sets the flip-flop F1 at its S terminal.

The presence of a cassette in the camera is registered by the switch 101 which is designed to protrude slightly below the surface 102 on which the forward wall 58 of the cassette is seated in the camera. When no cassette is in the camera, the cassette switch is in the position shown in FIG. 6, in which the DC supply voltage at B+ is supplied, as a signal labeled DUMMY, to one input terminal of an AND gate 308. When a cassette is in the camera, the switch 101 engages the lower contact in FIG. 6, and supplies a logic 1 signal at B+ to one input terminal of the gate 262. The second input terminal at the gate 262 receives the UP pulse produced by the multivibrator 276 as described above. Thus, when a cassette is in the camera and the UP pulse is produced, the gate 262 will produce a logic 1 output signal that will set the flip-flop F1 thus producing the RUN signal.

When the carrier 166 returns to its upper position, it closes the switch 229. Closing the switch 229 causes a ground level transition to trigger the multivibrator 276, causing the multivibrator 276 to produce a positive pulse labeled UP which was previously identified.

As described before, the UP pulse is applied to the second input terminal of the gate 262 causing the gate to set the flip-flop F1 when a cassette is present in the camera, but not effecting the flip-flop F1 if the UP pulse is produced when there is no cassette present or in the presence of a dummy cassette.

A spring-returned, manually operable push button SPB is provided which is used to begin operations when the camera 38 is loaded with a dummy cassette and has just had its film supply replenished. When momentarily depressed, the push button SPB produces a ground level transition that triggers a conventional multivibrator 310 to cause it to produce an output pulse labeled RESET. The RESET pulse and the DUMMY pulse reset the flip-flop F2 through the AND gate 308. It is also applied to an OR gate 312 to produce a signal labeled CTR SET. The CTR SET signal resets the counter 250 to a 0 count. The RESET signal when applied to the OR gate 280 removes the INHIBIT signal that disables the payment taker 284. It also, through gate 264 as will be recalled, resets the flip-flop F1. The gate 314 produces a logic 1 output signal in response to the signals C10 and STOP applied at its input terminals. The gate 314 has an output terminal connected to the second input terminal of the gate 274. The signal C10 is produced by a gate 252 as described above, when the counter 250 has counted 10 exposures and thus indicates that the last film unit in the cassette of 10 film units has been used, making it necessary to change the cassette. Of course, different numbers of film units in the cassette would require the counter gate 252 to detect correspondingly different counts at which the cassettes would be changed. The output pulse of the gate 314 is simultaneously applied to one of the terminals of each of gates 312 and 274. The pulse as applied to gate 312 generates the CTR SET signal which resets the counter 250 to 0, and as applied to one of the terminals of the gate 274 resets the flip-flop F2 to produce the INDEX signal previously described.

Having described the construction of the apparatus and its control system, its operation will next be described with reference to FIGS. 1 through 6. In describing the operation of the invention, it will be assumed that the apparatus is energized by the power supplies, that the cassette elevator 166 is in its upper position as shown in FIG. 4, the shutter blade 258 is in its closed position as shown in FIG. 6, the flip-flops F1, F2 and F3 are reset, the counter 250 is in its count 0 state, the pick 136 is in the position shown in FIG. 3, and the apparatus is ready to be loaded with a new supply of the cassettes 50.

Referring now to FIG. 4, we will further assume that the elevator 166 as shown in its up position is loaded with a dummy cassette. As previously mentioned, the function of the dummy cassette is to provide the DUMMY signal as a result of the switch 101 being shown in its position in FIG. 6. Without the presence of the RESET signal, the gate 308 is not triggered and consequently the INDEX signal is not provided to turn on the switch 278 to energize the motor 200. In this state the apparatus is in readiness to receive a fresh supply of the cassettes 50. Referring to FIG. 4, it can be seen that the trays 184 are in a position to receive a fresh supply of cassettes which are manually inserted into the open end of the trays 184 filling up 21 of the 22 trays. After a fresh supply of film has been loaded into each of the trays 184, the operator presses the switch SPB to trigger the multivibrator 310 which, in turn, produces the RESET signal. In the presence of the DUMMY and RESET signals gate 308 is triggered to provide a logic signal to the OR gate 274 whose output is connected to the set terminal of flip-flop F2. When the flip-flop F2 receives the logic pulse from gate 274 at its set input terminal S, it produces a logic 1 signal labeled INDEX at its logic 1 output terminal. The INDEX signal turns on the switch 278 and consequently the motor 200 begins to turn. The INDEX signal is also applied to one terminal of the OR gate 280 which, in turn, produces the INHIBIT signal at the logic 0 output terminal of the flip-flop F3. The INHIBIT signal disables the payment taker 284 while the motor 200 is running.

Once the motor 200 has been energized, it lowers the elevator 166 to its down position, indexes the conveyor 164 to place a fresh cassette 50 into reference position A located directly over the elevator 166, and then raises the elevator 166 into its up position where the cassette 50 is placed in the cassette locating chamber frame 100. Wall 58 of the cassette 50 is then in contact with the horizontal surface 102 where the switch 101 is located.

When the cassette 50 is in its locating chamber 100, switch 101 is placed in its down position as shown in FIG. 6 to provide the CASSETTE IN signal at one of the terminals of the gate 262. Also the elevator is in its up position thus actuating the switch 229 to trigger the multivibrator 276 which, in turn, supplies the UP signal to the other input terminal of the gate 262. The UP signal thus produced is also simultaneously applied to the reset logic terminal R of the flip-flop F2 in order to put it in its reset state thus removing the INDEX signal which, in turn, turns off the motor 200.

The output of gate 262 is applied to the logic input terminal S of the flip-flop F1 which produces the RUN signal at its logic 1 output terminal which, in turn, turns on the switch 266, thus causing the motor 126 to rotate. Rotation of the motor 126 being coupled to the gear train 124 and the film rollers 114 and 116 causes each of them to rotate. Thus the film rollers 114 and 116 are turning in readiness to accept the dark slide from the cassette 50.

The output signal from the gate 262 also produces a logic signal at the 0 logic terminal of the flip-flop F1 which triggers the multivibrator 268. The multivibrator 268 has an output pulse which is delayed prior to triggering the multivibrator 270. Triggering of the multivibrator 270 reduces the PICK signal at its output which turns on the switch 272. That, in turn, causes actuation of the rotary solenoid 150 which causes the pick 136 to advance the dark slide into engagement with the rollers after they have been rotating for some period of time caused by the delay pulse from the multivibrator 268. This process causes the dark slide to be ejected from the cassette from its exit slot 72 and thence to the exterior of the camera. The timing wheel 125, after completing its one revolution, closes the switch 123 thus triggering the multivibrator 266 causing the STOP signal at one of the input terminals to the gate 264. The output of the gate 264 resets the flip-flop F1.

With a fresh cassette 50 located in the camera, the system is now in a state where it is ready to accept payment from a potential user. The user places a coin or bill into the payment taker 284. This, in turn, closes the switch 286 and also turns on the ready light 292 which is an indication to the user that he should assume some suitable pose because his picture will be taken imminently. Closure of the switch 286 also causes the multivibrator 288 to produce an output pulse labeled READY after some suitable delay which allows the user to compose himself for the taking of his picture. The READY signal triggers the multivibrator 290 which, in turn, produces an output signal labeled TAKE. The STOP signal previously produced is present at the input terminal S of the flip-flop F3 which causes the ACCEPT signal at its logic 1 output terminal. In the presence of the TAKE and ACCEPT signals, the gate 282 produces a logic output signal labeled OPEN at its output which, in turn, turns on the switch 296. Closure of the switch 296 causes actuation of the shutter solenoid 298. This causes the shutter blade 258 to move upwardly thus uncovering the aperture 260 in readiness to expose the film units of the cassette 50.

When the shutter blade 258 moves to its upward position uncovering the aperture 260, it closes the switch 256 thus producing the TRIGGER signal which, in turn, fires the strobes ST1, ST2, and ST3 thus exposing the film. The TRIGGER signal is simultaneously applied to the multivibrator 254 which produces the COUNT signal at the input of the counter 250. The counter 250, in turn, supplies an input signal at one of the terminals of the gate 252.

When the shutter blade 258 returns to its closed position covering the aperture 260 under the influence of the spring 302, it closes the switch 304 thus triggering the multivibrator 306. The output of the multivibrator 306 is applied to the input S terminal of the flip-flop F1 which, in turn, causes the RUN signal to appear at its logic 1 output terminal. The presence of the RUN signal causes the rollers 114 and 116 to rotate and is followed by operation of the pick 136 to advance the film unit into the rotating rollers where it is processed as it moves through the rollers to the exterior of the camera and into the user's hands. This operation was previously described in connection with the ejection of the dark slide.

The process in connection with the exposure cycle just described is repeated until a count of 10 is received at the input terminals of the gate 252. When this occurs, the film supply in the cassette is obviously exhausted and the gate 252 responds with the output signal C10. In the presence of the output signal C10 and the STOP signal at the input terminals of the gate 314, it produces a logic output signal. This logic output signal is applied to one of the terminals of the OR gate 274 which, in turn, produces the INDEX signal at the output of the flip-flop F2 and, as well, produces an input signal at one of the terminals of the OR gate 312 which, in turn, produces the CTR SET signal which resets the counter 250 to its 0 count state.

The system at this point is in a state where it is ready to change the empty cassette and replace it by a new one as previously described in connection with the removal of the dummy cassette. This process will occur until all of the film cassettes have been used up and the dummy cassette comes around again and is placed in the reference A position. The system, as before, receives a signal to replace an expended cassette with a fresh cassette. Instead it now places the dummy cassette into the cassette locating chamber 100. However, when the dummy cassette is located in the cassette locating chamber 100, the switch 101 is now in its position as shown in FIG. 6. In this state, the system will not respond since all of the film will have been expanded.

It is apparent that the system is quite flexible in that it can be designed to handle any number of the cassettes 50 within its conveyor 164. Thus, the conveyor 164 may accommodate enough cassettes for the most extensive use intended between visits by the attendant and yet loaded with only one or a few cassettes for use in less frequently patronized installations, or during periods when lower use is anticipated. This may be accomplished by providing a second dummy cassette in the conveyor belt wherever it seems reasonable that the number of cassettes should be somewhat less than the total capacity of the system.

While the invention has been described with reference to the details of a particular embodiment, many changes and variations will occur to those skilled in the art upon reading this description. Such can obviously be made without departing from the scope of the invention.

I claim:

1. Photographic apparatus for use with a cassette holding a plurality of film units arranged in stacked relation therein, the cassette being of the type having a forward wall having an exposure aperture therein and a rear wall opposite the forward wall, said photographic apparatus comprising:

a camera for sequentially exposing the film units in such a cassette, said camera including cassette locating means on the underside thereof against which the forward wall of the cassette is adapted to be brought into engagement for locating the cassette in operative relation to the camera such that a forwardmost film unit in the stack is positioned for exposure through the aperture in the forward wall;

a conveyor for holding a plurality of cassettes and sequentially presenting each of the cassettes at an aligned position below said locating means with the forward wall of the cassette so positioned facing said locating means, said conveyor being configured to simultaneously move all of the cassettes thereon along a closed loop path of travel having a portion of which passes through said aligned position; and means engagable with the rear wall of a cassette located at the aligned position for raising such a cassette from the conveyor up into engagement with said locating means of the camera, for holding the cassette in engagement with said locating means until all of the film units in the cassette are exposed and thereafter returning the cassette to its aligned position on the conveyor.

2. The photographic apparatus of claim 1 wherein said conveyor includes a plurality of cassette holding trays coupled together in the form of a closed loop endless belt and indexing means for selectively indexing said endless belt one tray position at a time to sequentially present each said tray at said aligned position and said means for raising said cassette includes a cassette carrier movable between a first position wherein it is located out of the path of travel of said trays passing through said aligned position and a second position wherein it extends through said path of travel and holds a cassette, it has removed from one of said trays at said aligned position in response to movement of said carrier from said first position towards said second position, up in operative relation with said locating means of said camera.

3. The photographic apparatus of claim 2 wherein said carrier is configured to return a cassette, initially taken from one of said trays at said aligned position, to said one tray in response to moving said carrier from said second position toward said first position.

4. The photographic apparatus of claim 3 further including control means for controlling and coordinating the operation of said conveyor and said cassette carrier such that said indexing means is operational only when said carrier is located in its second position out of the path of travel of said trays with respect to said aligned position.

5. The photographic apparatus of claim 1 further including means for inhibiting the operation of said conveyor and said means for raising such a cassette after all of the cassettes held on said conveyor have been moved up into operative relation with said locating means of said camera.

6. Photographic apparatus for use with an automatic photostudio of the type having a self-developing camera therein which includes locating means for locating a cassette holding self-developing film units in operative relation with the camera, said apparatus comprising:
   a closed loop conveyor having a train of trays thereon, each said tray being configured to hold one film cassette, said conveyor being operative to move said train of trays along a closed loop path to sequentially present each of said trays at an aligned position below the cassette locating means of the camera; and
   means being operable for moving a cassette from one of said trays at said aligned position into operative relation with the locating means of the camera and, after the film units in the cassette have been expended, for moving the empty cassette back to said one tray at said aligned position.

7. An automatic photostudio for use with self-developing film units of the type supplied in a stack in a cassette having a forward wall including an exposure aperture therein and a rear wall opposite the forward wall; said automatic photostudio comprising:
   a housing divided into a studio compartment where the use of such photostudio sits to have his picture taken and an apparatus compartment for housing apparatus associated with the operation of said photostudio;
   means for defining an optical transmission path between said studio and apparatus compartments and along which image bearing light is transmitted between a user in said studio compartment and a camera in said apparatus compartment; and
   photographic apparatus located in said apparatus compartment and including:
   a camera positioned in operative relation with said optical transmission path for sequentially exposing the film units in such a cassette, said camera including cassette locating means on the underside thereof against which the forward wall of the cassette is adapted to be brought into engagement for locating the cassette in operative relation to the camera such that a forwardmost film unit in the stack is positioned for exposure through the aperture in the forward wall;
   a conveyor for holding a plurality of cassettes and sequentially presenting each of the cassettes at an aligned position below said locating means with the forward wall of the cassette, so positioned, facing said locating means, said conveyor being configured to simultaneously move all of the cassettes thereon along a closed loop path of travel having a portion of which passes through said aligned position; and
   means engageable with the rear wall of a cassette located at the aligned position for raising such a cassette from the conveyor up into engagement with said locating means of the camera, for holding the cassette in engagement with said locating means until all of the film units in the cassette are exposed and thereafter for returning the cassette to its aligned position on the conveyor.

* * * * *